(12) United States Patent
Park et al.

(10) Patent No.: US 9,681,089 B2
(45) Date of Patent: Jun. 13, 2017

(54) METHOD FOR CAPTURING CONTENT PROVIDED ON TV SCREEN AND CONNECTING CONTENTS WITH SOCIAL SERVICE BY USING SECOND DEVICE, AND SYSTEM THEREFOR

(71) Applicant: Korea Advanced Institute of Science and Technology, Daejeon (KR)

(72) Inventors: Hyo Jin Park, Daejeon (KR); Jun Kyun Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 271 days.

(21) Appl. No.: 14/380,339

(22) PCT Filed: Dec. 6, 2012

(86) PCT No.: PCT/KR2012/010529
§ 371 (c)(1),
(2) Date: Aug. 21, 2014

(87) PCT Pub. No.: WO2013/129760
PCT Pub. Date: Sep. 6, 2013

(65) Prior Publication Data
US 2015/0016799 A1     Jan. 15, 2015

(30) Foreign Application Priority Data

Feb. 29, 2012  (KR) .................. 10-2012-0020684

(51) Int. Cl.
*H04N 5/77* (2006.01)
*H04N 5/91* (2006.01)
(Continued)

(52) U.S. Cl.
CPC ............... *H04N 5/91* (2013.01); *G06Q 10/10* (2013.01); *G06Q 50/01* (2013.01); *H04L 65/4076* (2013.01)

(58) Field of Classification Search
CPC ........................... H04N 21/632; G06Q 50/00
(Continued)

(56) References Cited

U.S. PATENT DOCUMENTS

| 2003/0149781 A1* | 8/2003 | Yared ............ G06F 21/41 709/229 |
| 2007/0250632 A1* | 10/2007 | Nomura ........... H04L 63/08 709/227 |
| 2012/0246191 A1* | 9/2012 | Xiong ............ G06Q 50/01 707/769 |

FOREIGN PATENT DOCUMENTS

| KR | 10-2007-0018181 | 2/2007 |
| KR | 10-1000893 | 7/2010 |

(Continued)

OTHER PUBLICATIONS

International Search Report for PCT/KR2012/010529, dated Mar. 19, 2013.

*Primary Examiner* — Hung Dang
*Assistant Examiner* — Girumsew Wendmagegn
(74) *Attorney, Agent, or Firm* — Marshall, Gerstein & Borun LLP

(57) ABSTRACT

Disclosed are a method for capturing content provided on a TV screen and connecting the content with a social service by using a second device, and a system therefor. A capture service system comprises: a service server for obtaining profile information on a user from a social service server in which a second terminal or the user is registered, if the user requests content, which is being reproduced in a first terminal, to be captured by using the second terminal; and a media server for capturing an image or video of the content (Continued)

according to copyright information of the content requested to be captured by the user. At this point, the service server can receive the captured image or video from the media server and provide the received image or video to the second terminal.

11 Claims, 7 Drawing Sheets

(51) Int. Cl.
    *G06Q 10/10*     (2012.01)
    *G06Q 50/00*     (2012.01)
    *H04L 29/06*     (2006.01)

(58) Field of Classification Search
    USPC .......................................................... 386/201
    See application file for complete search history.

(56) References Cited

FOREIGN PATENT DOCUMENTS

| | | |
|---|---|---|
| KR | 10-2010-0038251 | 4/2011 |
| KR | 10-2011-052137 | 5/2011 |
| KR | 10-2011-0054357 | 5/2011 |
| KR | 10-2011-085829 | 7/2011 |
| KR | 10-2012-0002719 | 1/2012 |

\* cited by examiner

METHOD FOR CAPTURING CONTENT PROVIDED ON TV SCREEN AND CONNECTING CONTENTS WITH SOCIAL SERVICE BY USING SECOND DEVICE, AND SYSTEM THEREFOR

TECHNICAL FIELD

Embodiments of the present invention relate to a method of capturing a scene on a television (TV) screen and sharing the captured scene with a social service using a second device.

RELATED ART

When a user, for example, a viewer has viewed a television (TV) program or content, an impressive or interesting part on the side of the user may be separately provided, thereby maximizing the utilization of content.

With a social service being more active, the desire of a user to capture a favorite scene on a TV screen and to share the captured scene at a social service is also increasing. The user does not simply consume content but also creates a message relevant to the content such as after-view comments. Also, the user may serve to create and provide information by posting the created message at the social service.

Korean Patent Laid-Open Publication No. 10-2011-0085829 and No. 10-2011-0052137 propose a method and apparatus for sharing content based on a social network.

A user may post a message including feelings or opinions about content having been viewed by the user, at a social service being used by the user. The message may be related to a predetermined portion of the content, for example, a predetermined clip of the content.

However, currently, a method of capturing a scene on a TV screen is very limited. Although the above method is applicable by taking a photo using a smartphone and the like, it may cause a copyright issue.

DETAILED DESCRIPTION OF INVENTION

Subjects to be Solved

An aspect of the present invention provides a method and system that may provide user information to a content provider in response to a request from the user for capturing television (TV) content being currently viewed by the user using a second device, and that enables the content provider to create a corresponding image and to provide the created image to be available at a social service of the corresponding user.

Solutions to be Carried Out

According to an aspect of the present invention, there is provided a capture service system, including: a service server configured to acquire profile information of a user from a second terminal or a social service server to which the user is registered, in response to a request from the user for content being played back at a first terminal using the second terminal; and a media server configured to capture an image or a video of the content based on copyright information of the content requested to be captured by the user. Here, the service server may receive the captured image or video from the media server and to provide the captured image or video to the second terminal.

The service server may receive, from the second terminal, capture request information including identification information of the content, and may transfer the capture request information to the media server. The media server may capture the image or the video of the content corresponding to the identification information.

The service server may receive, from the second terminal, capture request information including identification information of the user, may verify identification information of the content requested to be captured by the user based on the identification information through interaction with a content server configured to provide the content to the first terminal, and may transfer the identification information of the content and the capture request information to the media server. The media server may capture the image or the video of the content corresponding to the identification information transferred from the service server.

The service server may provide the captured image or video to the social service server in response to the request of the user.

The social service server may display the captured image or video in an embedded form or a linked content form.

The service server may include: an authorization module configured to authorize the user through interaction with the social service server, in response to an authorization request from the second terminal for the user; a profile acquirement module configured to acquire profile information of the authorized user from the second terminal or the social service server; a social service interface configured to provide an interface connected with the social service server for authorizing the user or displaying the captured image or video; a capture interface configured to provide an interface connected with the media server for capturing the content; and a statistics module configured to collect statistical information regarding service use information requested and responded via the social service interface and the capture interface.

The media sever may include: a capture display interface configured to provide an interface connected with the service server for providing the captured image or video; a statistics module configured to collect statistical information regarding service use information requested and responded via the capture display interface; a right decision module configured to determine whether it is possible to capture the content by verifying copyright information of the content; and a content capture engine configured to capture the image or the video of the content when it is possible to capture the content.

According to another aspect of the present invention, there is provided a service server, including: an authorization module configured to authorize a user through interaction with a social service server to which the user is registered, in response to an authorization request from the user viewing content through a first terminal using a second terminal; a profile acquirement module configured to acquire profile information of the authorized user from the second terminal or the social service server; and a capture interface configured to receive, from the second terminal, capture request information regarding the content being viewed by the user, to transfer the capture request information to a capture engine, to receive, from the capture engine, an image or a video of the content captured based on the capture request information, and to provide the captured image or video of the content to at least one of the second terminal and the social service server. Here, a right to use the image or the video of the content may be granted to the user.

The capture request information may include at least one of identification information of the content and identification information of the user provided from the first terminal in response to a request of the second terminal.

The capture request information may include identification information of the user provided from the first terminal in response to a request of the second terminal. Here, the capture interface may verify identification information of the content requested to be captured by the user based on the identification information of the user through interaction with a content server configured to provide the content to the first terminal, and may transfer the identification information of the content and the capture request information to the capture engine.

The capture engine may verify whether it is possible to capture the content based on copyright information of the content, and may capture the image or the video of the content when it is possible to capture the content.

According to still another aspect of the present invention, there is provided a terminal, including: an authorization module configured to request a capture service system providing a capture service for content being viewed by a user using a content playback device to authorize the user; and a capture module configured to transmit, to the capture service system, capture request information including at least one of identification information of the user and identification of the content provided from the content playback device, in response to a request from the authorized user for capturing the content, and to receive, from the capture service system, an image or a video of the content captured based on the capture request information. Here, the capture service system may authorize the user through interaction with a social service server to which the user is registered, may acquire profile information of the user from the social service server in response to the request for capturing the content, may capture the image or the video of the content, and may grant the user with a right to use the captured image or video.

According to still another aspect of the present invention, there is provided a capture service method of a capture service system configured to provide a capture service for content being played back, wherein the capture service system includes a service server and a media server, and the capture service method includes: acquiring, by the service server, profile information of a user from a second terminal or a social service server to which the user is registered, in response to a request from the user for capturing the content being played back at a first terminal using the second terminal; capturing, by the media server, an image or a video of the content based on copyright information of the content requested to be captured by the user, and transferring the captured image or video to the service server; and receiving, by the service server, the captured image or video from the media sever, and providing the captured image or video to the second terminal. Here, a right to use the captured image or video may be granted to the user based on acquirement of the profile information.

Effects of Invention

According to embodiments of the present invention, a user may provide profile information of the user registered to a social service of the user to a content provider, may acquire captured image or video information of desired content, and may use the captured image or video information at the social service of the user.

According to embodiments of the present invention, a content provider may legitimately solve an issue associated with content capturing, which is being illegitimately performed, may also collect, as statistical information, a user having requested corresponding content and activity details, and may use the statistical information to construct content-based big data in the future and may also use the statistical information for a content recommendation environment at the social service.

DETAILED DESCRIPTION OF DRAWINGS

BEST MODE

Hereinafter, embodiments of the present invention will be described with reference to the accompanying drawings.

Figure 1:
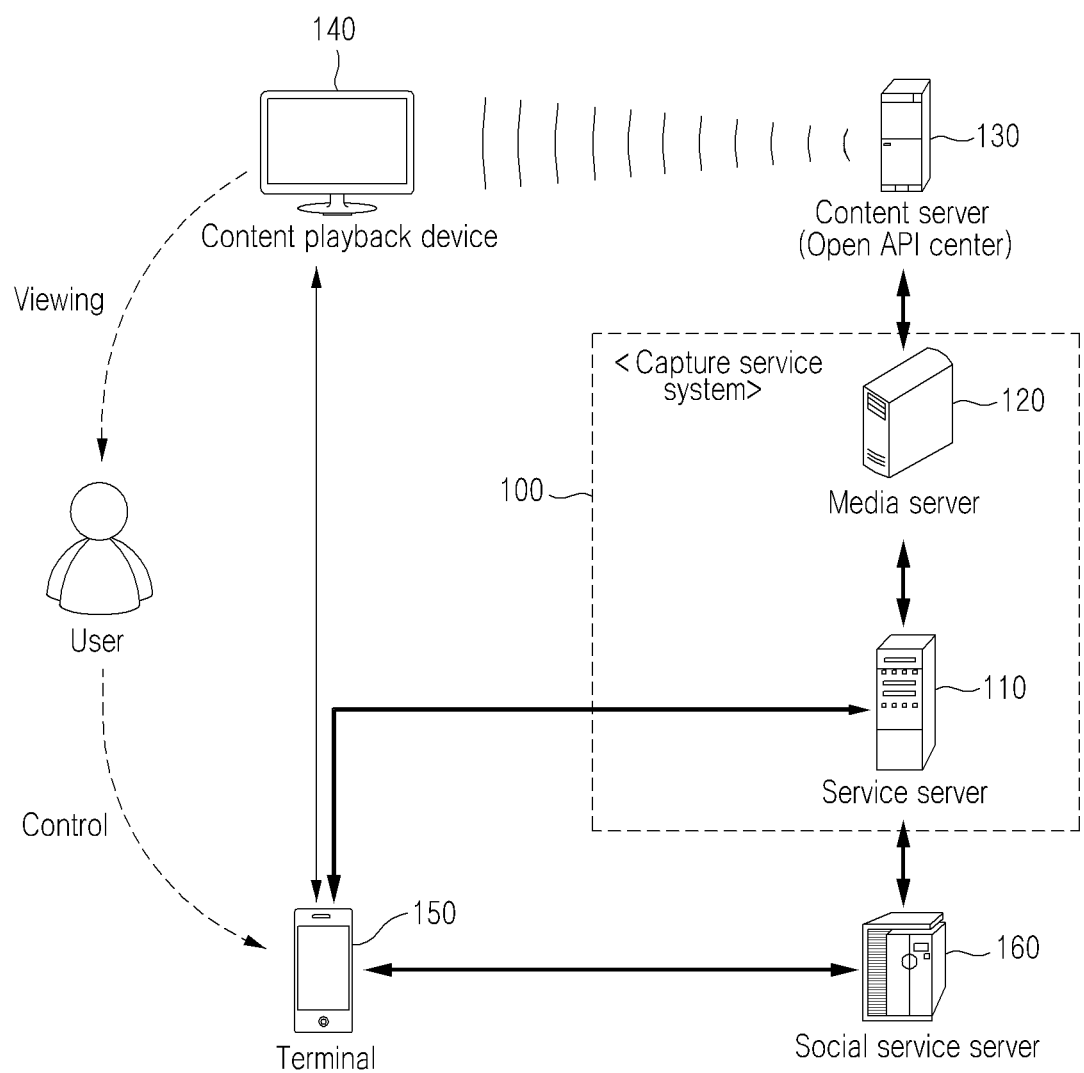
FIG. 1 is a diagram describing a capture service system and entities associated with the capture service system according to an embodiment of the present invention.

FIG. 1 is a diagram describing a capture service system and entities associated with the capture service system according to an embodiment of the present invention.

In the present specification, the term "content" may indicate multimedia content. For example, the content may indicate a television (TV) program, a multimedia file, an application or an App, and a web page.

The capture service system 100 refers to a system configured to provide a capture service associated with content, and provides a method of easily capturing content provided on a content playback device 40 using a separate terminal 150 and sharing the captured content at a social service server 160.

The capture service system 100 includes a service server 110 and a media server 120. Here, for the capture service, the service server 110 provides an interface with the terminal 150 and the social service server 160. The media server 120 provides an interface with a content server 130. Basically, the capture service system 100 is to provide a legitimately captured image to a user based on an information trading relationship established with the user. That is, the user may provide personal information and in return, may legitimately use image information of the corresponding content.

To provide content, the content server 10 manages a content database and a metadata database. Here, the content database may manage the content and information for providing the content. The metadata database may manage metadata of the content. The content server 130 supports an open application programming interface (API) center that provides an access to the content. The content server 130 may provide the content and the metadata of the content to the service server 110, the media server 120, and the content playback device 140 using the content database and the metadata database.

The content playback device 140 refers to a device used when the user plays back content transmitted from the content server 130 to view the content. In the present specification, the content playback device 140 may also be referred to as a first terminal. For example, the content playback device 140 may include a predetermined device, such as a smart TV, a personal computer (PC), a notebook, an Internet protocol television (IPTV), a set-top, a mobile phone, and a smartphone, capable of playing back media content.

The terminal 150 refers to a device used when the user requests the capture service system 100 for capture and creates a message at the social service server 160. In the present specification, the terminal 150 may also be referred to as a second terminal. For example, the terminal 150 may include a predetermined device, such as a smart TV, a PC, a notebook, an IPTV, and a smartphone, communicable with the capture service system 100 and the social service server 160. The terminal 150 may perform a function of requesting capturing content being played back at the content playback device 140 and receiving captured image information of the corresponding content and a function that enables the user to create a message including the captured image information at a social service provided from the social service server 160. That is, with respect to content being viewed through the content playback device 140, the user may capture image information of the corresponding content using the terminal 150 and may describe descriptions or feelings about the corresponding content, including the captured image information, at the social service.

The social service server 160 refers to a server configured to provide the user with a social service such as a café and blog that enables the user to share information with other users. Here, the social service server 160 may post the message created by the user.

The aforementioned entities, for example, the capture service system 100, the content server 130, the content playback device 140, the terminal 150, and the social service server 160, may be mutually connected over a wired/wireless network. For example, the content playback device 140 and the terminal 150 may be connected over a local network, such as a home network. Also, each of pairs of 1) the content server 130 and the media server 120, 2) the service server 110 and the media server 120, 3) the terminal 150 and the service server 110, 4) the service server 110 and the social service server 160, and 5) the terminal 150 and the social service server 160 may be connected over a broadband network. In particular, when the content is a TV program, the content server 130 may transmit the content to the content playback device 140 over a broadcast. In this case, the content server 130 is a broadcasting server. Also, the content server 130 may transmit the content to the content playback device 140 using a method such as a multicast or a unicast in addition to the broadcast.

In the present embodiment, one or more entities may be the same physical device or a single physical device. For example, the content playback device 140 and the terminal 150 may be configured as the same physical device or a single physical device. Alternatively, the service server 110 and the media server 120 may be configured as the same physical device or a single physical device.

Hereinafter, a description will be made based on an example in which content is a video on demand (VOD) or a TV program in a broadcast form.

Figure 2:
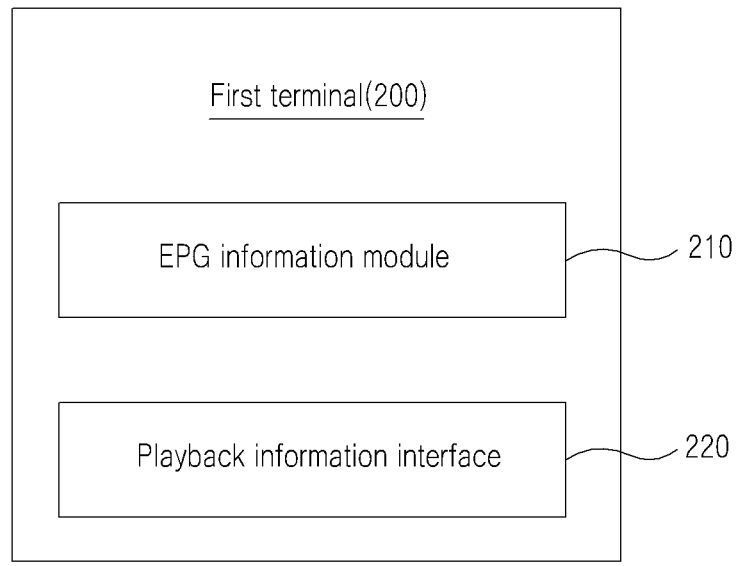
FIG. 2 is a block diagram illustrating an example of a content playback device, for example, a first terminal according to an embodiment of the present invention.

FIG. 2 is a block diagram illustrating an example of a content playback device, for example, a first terminal according to an embodiment of the present invention. A content playback device 200 may include an electronic program guide (EPG) information module 210 and a playback information interface 220.

Although not illustrated in FIG. 2, the content playback device 200 basically includes a device configured to request a content server for content desired to be viewed by a user and to receive the content, and a device configured to play back a video and an audio of the content.

The EPG information module 210 serves to extract EPG information from a signal, for example, an MPEG-transport stream (TS), corresponding to the content received from the content server.

The playback information interface 220 provides an interface connected with the EPG information module 210, and provides an interface function of notifying play information about content being currently played back. The content playback device 200 may manage user information and, depending on necessity, may provide information, for example, a user ID, of the user viewing the content.

Figure 3:
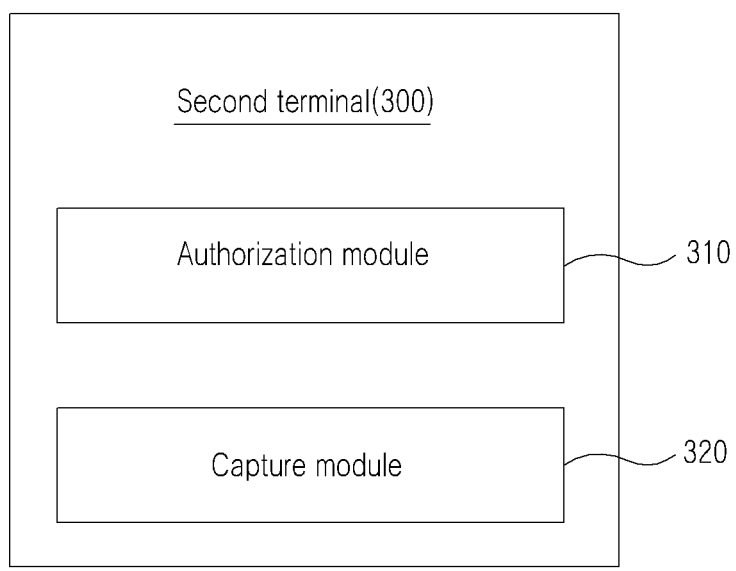
FIG. 3 is a block diagram illustrating an example of a terminal, for example, a second terminal for a capture request according to an embodiment of the present invention.

FIG. 3 is a block diagram illustrating an example of a terminal, for example, a second terminal for a capture request according to an embodiment of the present invention. A terminal 300 may include an authorization module 310 and a capture module 320. The authorization module 310 and the capture module 320 may include an application, for example, a smartphone application and a picture phone virtual machine (VM), exclusive for a mobile terminal such as a smartphone and a tablet. The application may be configured to be executed by at least one processor driven on the terminal 300.

The authorization module 310 refers to a module configured to provide an authorization procedure for interaction with an external social service. The authorization module 310 may request a capture service system providing a capture service for the content being viewed by the user through a content playback device to authorize the user. The authorization module 310 may store a corresponding key on the terminal 300, that is, the corresponding application when authorizing the user according to a third party policy of the capture service system and accordingly thereto, may interact with the capture service without a login procedure in the future.

The capture module 320 refers to a module configured to receive capture request information from the user viewing the content through the content playback device. The capture module 320 may need to provide a capture request and a captured thumbnail image or video to the terminal 300, and serves to post text and location information associated with the corresponding content to a social service server. The capture module 320 supports a function of transmitting, to the capture service system, capture request information including at least one of identification information of the content and identification information of the user provided from the content playback device, in response to a request of the user for capturing the content, and a function of receiving, from the capture service system, an image captured based on the capture request information and providing the captured image to the terminal.

Figure 4:
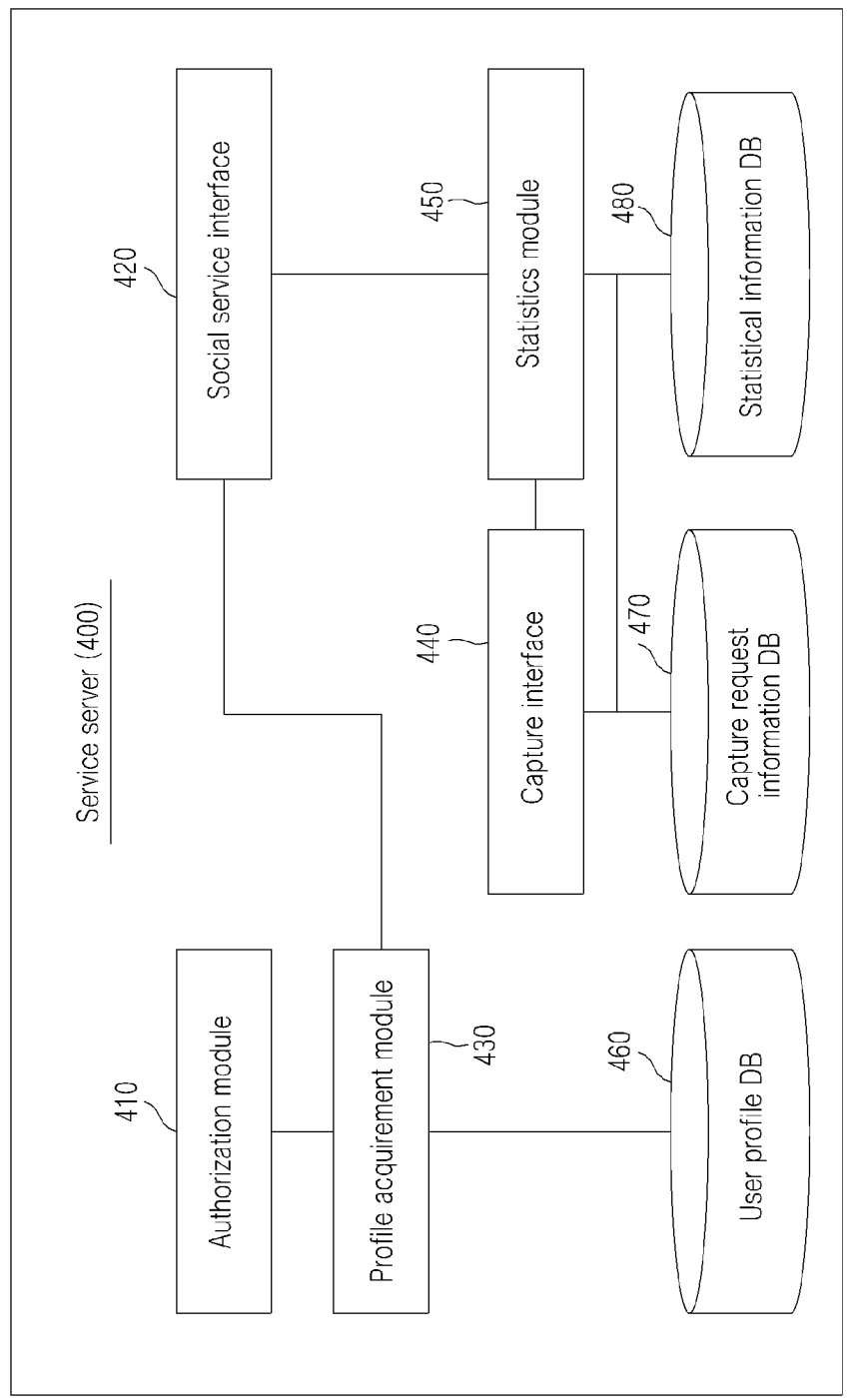
FIG. 4 is a block diagram illustrating an example of a service server according to an embodiment of the present invention.

FIG. 4 is a block diagram illustrating an example of a service server according to an embodiment of the present invention.

A service server 400 is a configuration of a capture service system and serves to go through a user authorization and to acquire profile information of a corresponding user from a terminal or a social service server, in response to a request of the user for capturing content being viewed at a content playback device using the terminal corresponding to a second device.

Referring to FIG. 4, the service server 400 may include an authorization module 410, a social service interface 420, a profile acquirement module 430, a capture interface 440, a statistics module 450, a user profile database 460, a capture request information database 470, and a statistical information database 480.

The authorization module 410 refers to a module configured to interact with an external open authorization based system in response to an authorization request in a terminal environment for interacting with an external social service. In response to an authorization request from the user viewing content through the content playback device using the terminal, the authorization module 410 may perform a user authorization procedure through interaction with the social service server to which the corresponding user is registered. Accordingly, a function of storing a corresponding key, for example, an Oauth key in the service server 400 when performing an open authorization for user convenience is provided. Also, interaction with the external social service without a re-login procedure is enabled during a valid period of the key.

The social service interface 420 functions as a single window of an interface connected with the external social service, and provides an interface function for externally displaying the captured image and authorizing the user. Here, a service request and a response provided through the social service interface 420 are provided to the statistics module 450.

The profile acquirement module 430 serves to collect profile information of the user from the terminal, that is, a corresponding application of the terminal, or the external social service being used by the user. In detail, the profile acquirement module 430 may acquire profile information of the authorized user from the terminal or the social service server. Here, the acquired profile information is stored and managed in the user profile database 460.

The capture interface 440 refers to an interface called in response to a capture request of the user, and provides an interface connected with a media server for capturing the content. The capture interface 440 serves to store program information and time information of the content requested to be captured by the user in the capture request information database 470. Here, the capture request information may include at least one of identification information of the content and identification information of the user provided from the content playback device in response to a request of the terminal. When the capture request information about the content being viewed by the user is received from the terminal, the capture interface 440 may transfer the capture request information to the media server providing a capture engine. The capture engine serves to receive, from the media server, an image captured based on the capture request information, and to provide the captured image to at least one of the corresponding terminal and the social service server.

The statistics module 450 serves to collect statistical information about service use information, for example, the capture request and display of the captured content, requested and responded through the social service interface 420 and the capture interface 440. Here, the collected statistical information is stored and managed in the statistical information database 480.

Figure 5:
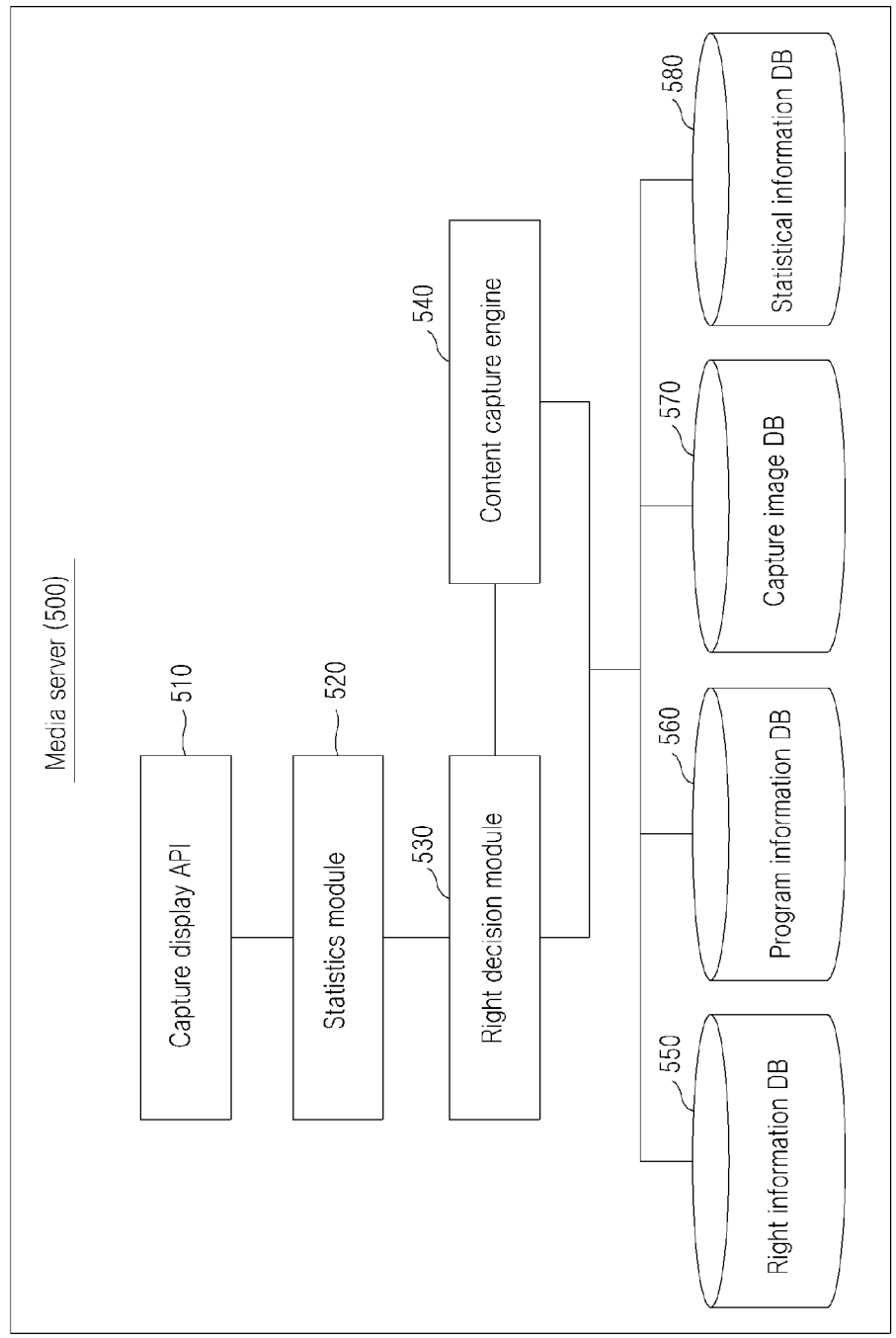
FIG. 5 is a block diagram illustrating an example of a media server according to an embodiment of the present invention.

FIG. 5 is a block diagram illustrating an example of a media server according to an embodiment of the present invention.

A media server 500 is a configuration of a capture service system, and serves to capture an image or a video of content based on copyright information of the content requested to be captured by a user through a terminal. In the present specification, the terms "capture image", "thumbnail image", and "captured image" correspond to a captured image or video of the content being viewed by the user and thus, may be construed to have the same meaning.

Referring to FIG. 5, the media server 500 includes a capture display API 510, a statistics module 520, a right decision module 530, a content capture engine 540, a right information database 550, a program information database 560, a capture image database 570, and a statistical information database 580.

The capture display API 510, that is, a capture display interface serves to be in charge of an external interface in a media server of a content provider and provides an interface connected with a service server to provide a captured image. In detail, the capture display API 510 provides a content capture request and a response function thereto.

The statistics module 520 serves to create statistical information regarding information requested and responded through the media server 500. In detail, the statistics module 520 may collect statistical information regarding service use information requested and responded through the capture display API 510. Here, the collected statistical information is stored and managed in the statistical information database 580.

The right decision module 530 serves to verify copyright information (rights) for each item of content stored in the right information database 550 and to determine whether it is possible to provide a capture service of corresponding content. As a method of limiting capture of a predetermined scene, for example, a principal scenario part, a capture service for the corresponding scene may be limited when copyright is individually present within single content.

When it is possible to capture the corresponding content, the content capture engine 540 serves to capture an image or a video of a corresponding scene based on capture request information, in response to a user request. Here, to acquire information about the content being viewed by the user, information about the content being currently played back may be requested and acquired by referring to the program information database 560 or through a playback information interface of the content playback device, using capture request information. The captured image or video is stored and managed in the capture image database 570. Further, the image or the video captured by the content capture engine 540 may be transferred to a capture interface of the service server to be provided to the terminal or the social service of the user.

When the user having requested the capture is a paid content customer, the media server 500 may support an additional service, for example, a moving picture clip and an unlimited capture service, to enhance a user satisfaction.

Figure 6:
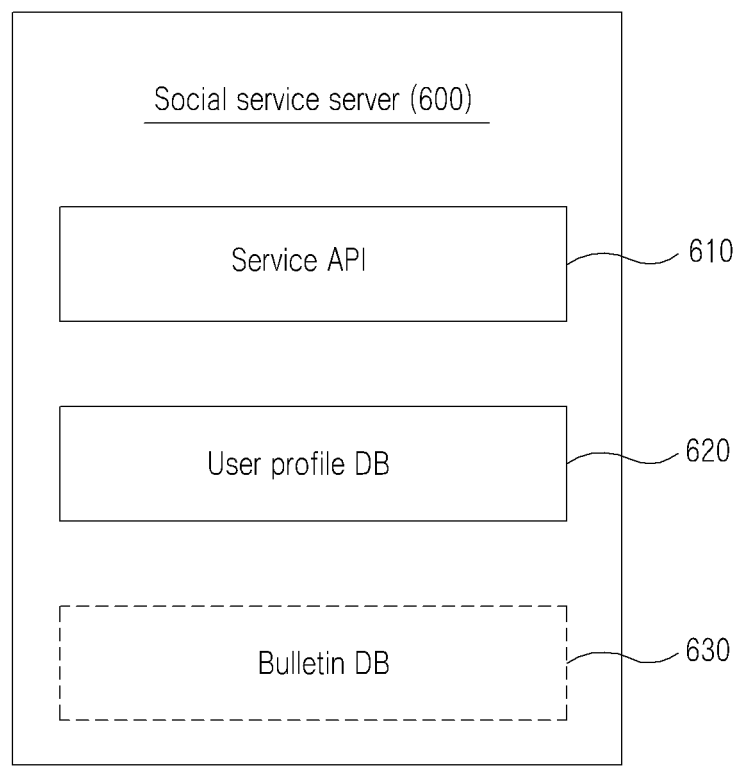
FIG. 6 is a block diagram illustrating an example of a social service server according to an embodiment of the present invention.

FIG. 6 is a block diagram illustrating an example of a media server according to an embodiment of the present invention.

Referring to FIG. 6, a social service server 600 may include a service API 610, a user profile database 620, and a bulletin database 630.

The service API 610 indicates an open APIs service that provides a social service such as a café and a blog, so that a user may readily post a message and may share the message with other users.

The user profile database 620 stores profile information about the user using the social service. That is, the user profile database 620 manages profile information of the user stored by third party services.

The bulletin database 630 stores description of content captured and posted in response to a request of the user. The description including the captured image posted on the social service server 600 may be displayed in an embedded form or a linked content form. Java Script code or link information may be provided together with an image to collect a user reaction about the corresponding content.

TABLE 1

| Name | Description |
|---|---|
| id | The user's Facebook_ID |
| name | The user's full_name |
| first_name | The user's first_name |
| middle_name | The user's middle_name |
| last_name | The user's last_name |
| gender | The user's gender: female or male |
| locale | The user's locale |
| languages | The user's languages |
| link | The URL of the profile for the user on Facebook |
| username | The user's Facebook username |
| third_party_id | An anonymous, but unique identifier for the user; only returned if specifically requested via the fields?URL parameter |
| timezone | The user's timezone offset from UTC |
| updated_time | The last time the user's profile was updated; changes to the languages, link, timezone. verified, interested_in, favorite_athletes, favorite_teams, and video_upload_limits are not not reflected in this value |
| verified | The user's account verification status, either true or false(see below) |
| bio | The user's biography |

TABLE 2

| Name | Description |
|---|---|
| birthday | The user's birthday |
| education | A list of the user's education history |
| email | The proxied or contact email address granted by the user |
| hometown | The user's hometown |
| interested in | The genders the user is interested in |
| location | The user's current city |
| political | The user's political view |
| favorite_athletes | The user's favorite athletes; this field is deprecated and will be removed in the near future |
| favorite_teams | The user's favorite teams; this fleid is deprecated and will be removed in the near future |
| quotes | The user's favorite quotes |
| relationship_status | The user's relationship status: Single, In a relationship, Engaged, Married. It's complicated, In an open relationship, Widowed, Separated, Divorced. In a civil union. In a domestic partnership |
| religion | The user's religion |
| significant_other | The user's significant other |

TABLE 2-continued

| Name | Description |
|---|---|
| video_upload_limits | The size of the video file and the length of the video that a user can upload; only returned if specifically requested via the fields URL parameter |
| website | The URL of the user's personal website |
| work | A list of the user's work history |

In the case of, for example, Facebook, values of a user object provided through a social graph API as profile information of the user acquired in response to the capture request may be expressed by Table 1 and Table 2. Such information may be variously employed for marketing. Additionally, it is possible to collect information about even comments related to embedded content or linked content among bulletins registered by the user.

Hereinafter, a capture related principal method will be described with reference to FIG. 7.

Figure 7:
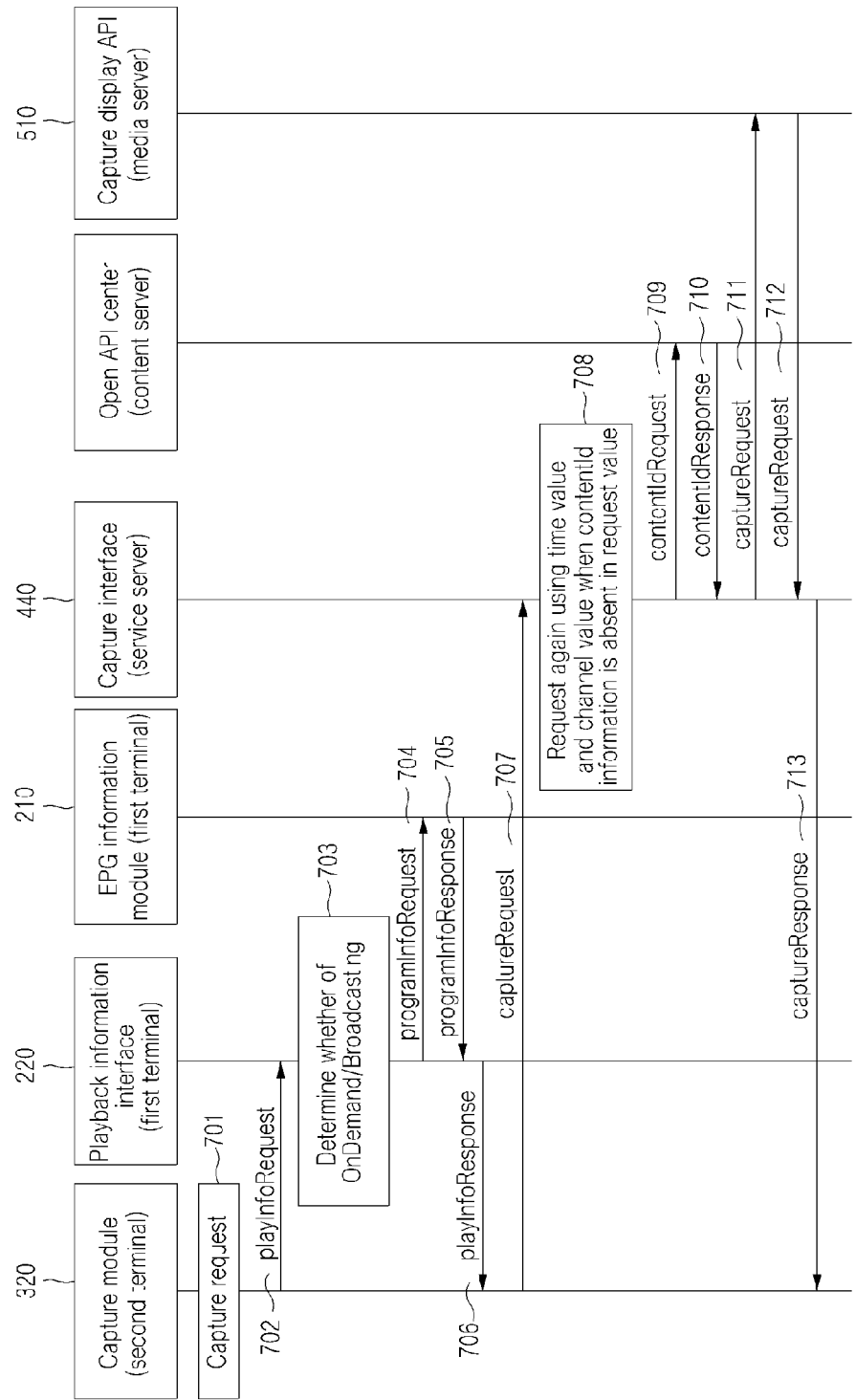
FIG. 7 illustrates an example of a content capture process according to an embodiment of the present invention.

FIG. 7 illustrates an example of a content capture process according to an embodiment of the present invention. The content capture process may be performed by a content playback device, a terminal, a service server, a media server, a content server, and a social service server described above with reference to FIGS. 1 through 6.

In response to a request from a user viewing content through the content playback device for capturing the content in operation 701, the capture module 320 of the terminal transmits a playback information request signal (playInfoRequest) to the playback information interface 220 of the content playback device in operation 702. Here, the playback information request signal may include identification information of the user (userId) and time information (datetime) as expressed by Table 3.

The playback information interface 220 of the content playback device determines a broadcast type, for example, a VOD or broadcasting, of the content being currently played back based on the playback information request signal in operation 703. In the case of broadcasting, the playback information interface 220 transfers a program information request signal (programInfoRequest) to the EPG information module 210 in operation 704.

In operation 705, the EPG information module 210 of the content playback device transfers program information of the content being currently played back to the playback information interface 220 as a response to the program information request signal (programInfoResponse).

Accordingly, in operation 706, the playback information interface 220 of the content playback device may provide, to the capture module 320 of the terminal, a response to the playback information request signal (playInfoResponse) including program information of the corresponding content. Here, the response signal (playInfoResponse) may include identification information of the user (userId), content playback information (contentOrder, contentId, contentTitle, and channel), and time information (datetime).

TABLE 3

| Module | Method | Parameter |
|---|---|---|
| Playback information interface | playInfoRequest | userId, datetime |
| | playInfoResponse | userId, contentOrder, contentId, contentTitle, channel, datetime |

TABLE 3-continued

| Module | Method | Parameter |
| --- | --- | --- |
| Capture module | captureRequest | userId, datetime, contentInfo |
| | captureResponse | userId, contentId, contentTitle, captureRequest, captureResponseCode |

Here, 'playInfoResponse' may describe information on a 'contentOrder' field in the case of using a picture in picture (PIP) form in which a plurality of contents is displayed on a single screen. The order may be based on a top end of a screen layout or a screen size. Also, 'contentId' follows a uniform resource identifier (URI) configuration (RFC4151).

When the capture module 320 of the terminal is accurately aware of program information of the content being currently played back through the content playback device, the aforementioned process including operations 701 through 706 may be omitted.

When a capture request signal (captureRequest) for the corresponding content is received from the capture module 320 of the terminal in operation 707, and in this instance, when identification information (contentId) of the corresponding content is absent in the capture request signal, the capture interface 440 of the service server may request an open API center of a content server for identification information (contentId) of the content using time information (datetime) and channel information (channel) included in the capture request signal (captureRequest) in operation 708. Here, the capture request signal (captureRequest) may include identification information of the user (userId), time information (datetime), and content information (contentInfo). Here, 'userID' may use an open authorization (Oauth) key, and 'contentInfo' may include values of contentId, contentTitle, providerId, and channelInfo in a structural form.

Accordingly, in response to a request signal to content identification information (contentIdRequest) received from the capture interface 440 of the service server in operation 709, the open API center of the content server may transmit, as a respond (contentIdResponse), identification information of the content being currently played back at the content playback device of the user in operation 710.

In operation 711, the capture interface 440 of the service server transfers, to the capture display API 510 of the media server, the capture request signal (captureRequest) including identification information (contentId) of the corresponding content. In response thereto, in operation 712, the media server captures an image or a video of the content through a content capture engine and transfers a response signal (captureResponse) to the capture request signal to the service server through the capture display API 510. Here, in operation 713, the capture interface 440 of the service server transmits the capture response signal (captureResponse) to the terminal of the user. As expressed by Table 3, the capture response signal (captureResponse) may include identification information of the user (userId), content playback information (contentId and contentTitle), and capture request response information (captureRequest and captureRequestCode). Here, a 'captureRequest' value indicates a true or false value regarding whether the capture request is normally performed, and a 'captureRequestCode' value may define an error code (which may be arranged as a value, such as 0-O.K, 1-DRM not Free, and 2-Server Error).

Figure 8:
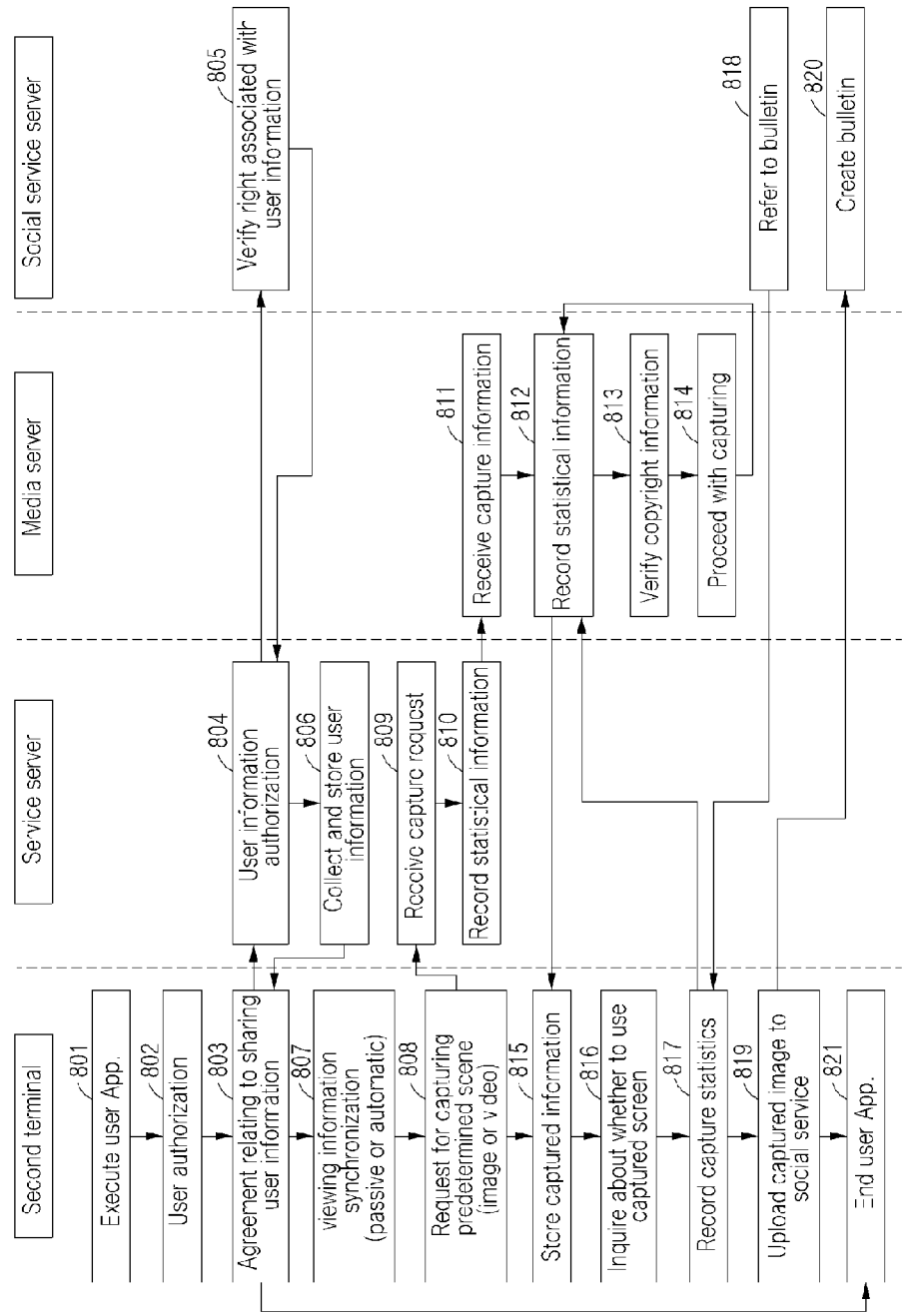
FIG. 8 illustrates an example of the overall operation process of a capture service according to an embodiment of the present invention.

FIG. 8 illustrates an example of the overall operation process of a capture service according to an embodiment of the present invention. The capture service method may be performed by a terminal, a service server, a media server, and a social service server described above with reference to FIGS. 1 through 6.

In operations 801 through 803, the terminal goes through a user authorization by executing an application associated with a capture service and inputs an agreement of a user relating to sharing user information for the capture service. Here, the user authorization may indicate an application-self authorization or an authorization through interaction with a social service being used by the user.

When the agreement relating to sharing information is transferred from the terminal of the user, the service server performs an authorization procedure on user information through interaction with the social service server in operation 804. Here, in operation 805, the social service server may verify a right associated with the corresponding user information to authorize the user information in response to the request of the service server.

When the user authorization is completed through interaction with the social service server, the service server collects and stores profile information of the user provided from the social service server in operation 806. Here, profile information of the user may be directly collected from the terminal of the user.

In operation 807, the terminal may request a viewing information synchronization with respect to the content being currently viewed by the user through the content playback device. Here, the user may directly request the content playback device for the viewing information synchronization (passive request), or may request the content playback device for the viewing information synchronization using the terminal (automatic request).

In operation 808, in response to a request from the user for capturing the content being currently viewed through the content playback device, the terminal transmits, to the service server, capture request information including at least one of identification information of the user and identification information of the content.

In operations 809 and 810, the service server receives the capture request information from the terminal, records the received capture request information as statistical information of the service server, and transfers the capture request information to the media server.

In operations 811 and 812, the media server receives the capture request information of the user from the service server and records the received capture request information as statistical information of the media server.

In operations 813 and 814, the media server recognizes identification information of the content from the capture request information, verifies copyright information of the content corresponding to the identification information, and proceeds with capturing the content when it is possible to capture the content. Here, the media server records a capturing progress of the content as the statistical information of the media server and transfers the captured image to the service server. Accordingly, the service server may provide the image captured by the media server to the terminal of the user having requested capturing the image. The media server may grant the user with a legitimate right to use the captured image provided from the media server, in return for profile information provided by the user.

In operation 815, the terminal stores, in the terminal, the captured image provided from the media server over the service server. Here, in operation 816, an application associated with the capture service inquires about whether to use the captured image through a social service.

In operations 817 and 818, when the user is to use the captured image through the social service, the terminal may record use information about the captured image as statistical information of the terminal and may upload the captured image to the social service being used by the user. Here, the captured image may be directly uploaded from the terminal to the social service, or may be uploaded from the service server to the social service in response to a request of the user through the terminal. In operation 819, the social service server may receive the captured image from the terminal or the service server, and may create and post a notice including the captured image. In operation 820, when the corresponding bulletin of the user is referred to from a friend with whom the user has set a relationship, the social service server provides corresponding reference information to the terminal so that the reference information may be recorded as statistical information of the terminal.

The capture service providing method of FIG. 8 may include a reduced number of operations or additional operations based on an operation of the capture service system described above with reference to FIGS. 1 through 7. Also, at least two operations may be combined and orders of the operations may be changed.

As described above, according to embodiments of the present invention, it is possible to provide a legitimately captured image to the user based on an information trading relationship established with the user. That is, the user may provide personal information of the user and in return, may legitimately use image information of the corresponding content.

The methods according to embodiments of the present invention may be implemented through a variety of computer systems, and may be configured in a program instruction form and be recorded in non-transitory computer-readable media. The non-transitory computer-readable media may also include, alone or in combination, program instructions, data files, data structures and the like. The program instructions recorded in the media may be specially designed for the invention or may be of the kind well-known and available to those having skill in the computer software arts. Also, the file system may be recorded in non-transitory computer-readable media. Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A capture service system, comprising:
a service server configured to acquire profile information of a user from a social service server providing a social service to which the user is registered, in response to a request from a second terminal of the user for capturing content being played back at a first terminal, the profile information being associated with the social service, and the service server identifying the content being played back at the first terminal based on the request; and
a media server configured to capture an image or a video included in the content based on the request,
wherein the service server is configured to receive the captured image or video from the media server and to provide the captured image or video to the social service server in an embedded form or a linked content form such that the captured image or video is accessible by the second terminal.

2. The capture service system of claim 1, wherein
the service server is configured to receive, from the second terminal, capture request information comprising identification information of the content, and to transfer the capture request information to the media server, and
the media server is configured to capture the image or the video of the content corresponding to the identification information.

3. The capture service system of claim 1, wherein
the service server is configured to receive, from the second terminal, capture request information comprising identification information of the user, to verify identification information of the content requested to be captured by the user based on the identification information through interaction with a content server configured to provide the content to the first terminal, and to transfer the identification information of the content and the capture request information to the media server, and
the media server is configured to capture the image or the video of the content corresponding to the identification information transferred from the service server.

4. The capture service system of claim 1, wherein the service server comprises:
an authorization module configured to authorize the user through interaction with the social service server, in response to an authorization request from the second terminal for the user;
a profile acquirement module configured to acquire profile information of the authorized user from the second terminal or the social service server;
a social service interface configured to provide an interface connected with the social service server for authorizing the user or displaying the captured image or video;
a capture interface configured to provide an interface connected with the media server for capturing the content; and
a statistics module configured to collect statistical information regarding service use information requested and responded via the social service interface and the capture interface.

5. The capture service system of claim 1, wherein the media sever comprises:
a capture display interface configured to provide an interface connected with the service server for providing the captured image or video;
a statistics module configured to collect statistical information regarding service use information requested and responded via the capture display interface;
a right decision module configured to determine whether it is possible to capture the content by verifying copyright information of the content; and
a content capture engine configured to capture the image or the video of the content when it is possible to capture the content.

6. A service server, comprising:
an authorization module configured to authorize a user through interaction with a social service server providing a social service to which the user is registered, in response to an authorization request from a second terminal of the user viewing content being played back at a first terminal;

a profile acquirement module configured to acquire profile information of the authorized user from the social service server, the profile information being associated with the social service; and a capture interface configured to receive, from the second terminal, capture request information regarding the content being played back at the first terminal, to identify the content being played back at the first terminal based on the capture request information, to transfer the capture request information to a capture engine, to receive, from the capture engine, an image or a video included in the content captured based on the capture request information, and to provide the captured image or video of the content to the social service server in an embedded form or a linked content form such that the captured image or video is accessible by the second terminal.

7. The service server of claim 6, wherein the capture request information comprises at least one of identification information of the content and identification information of the user provided from the first terminal in response to a request of the second terminal.

8. The service server of claim 6, wherein the capture request information comprises identification information of the user provided from the first terminal in response to a request of the second terminal, and the capture interface is configured to verify identification information of the content requested to be captured by the user based on the identification information of the user through interaction with a content server configured to provide the content to the first terminal, and to transfer the identification information of the content and the capture request information to the capture engine.

9. The service server of claim 6, wherein the capture engine is configured to verify whether it is possible to capture the content based on copyright information of the content, and to capture the image or the video of the content when it is possible to capture the content.

10. A terminal comprising:

an authorization module configured to request a capture service system providing a capture service for content being viewed by a user using a content playback device for authorizing the user, the capture service system interacting with a social service server providing a social service to which the user is registered and a profile information of the user being acquired from the social service server; and a capture module configured to transmit, to the capture service system, capture request information to capture an image or a video included in the content, and to allow accessing an image or a video of the content captured based on the capture request information and provided to the social service server.

11. A capture service method of a capture service system configured to provide a capture service for content being played back at a first terminal, wherein the capture service system comprises a service server and a media server, and the capture service method comprises:

acquiring, by the service server, profile information of a user from a social service server providing a social service to which the user is registered, in response to a request from a second terminal of the user for capturing the content being played back at the first terminal, the profile information being associated with the social service;

identifying, by the service server, the content being played back at the first terminal based on the request;

capturing, by the media server, an image or a video included in the content based on the request, and transferring the captured image or video to the service server; and receiving, by the service server, the captured image or video from the media server, and providing the captured image or video to the social service server in an embedded form or a linked form such that the captured image or video is accessible by the second terminal.

\* \* \* \* \*